(12) United States Patent
Tankleff (10) Patent No.: US 7,941,623 B2
(45) Date of Patent: May 10, 2011

(54) SELECTIVE EXPOSURE OF CONFIGURATION IDENTIFICATION DATA IN VIRTUAL MACHINES

(75) Inventor: Bruce Aaron Tankleff, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 787 days.

(21) Appl. No.: 11/948,633

(22) Filed: Nov. 30, 2007

(65) Prior Publication Data

US 2009/0144482 A1 Jun. 4, 2009

(51) Int. Cl.
*G06F 12/00* (2006.01)
(52) U.S. Cl. .............. 711/163; 711/6; 711/156; 718/1; 718/100; 713/1; 713/170
(58) Field of Classification Search .............. 711/163, 711/6, 156; 718/1, 100; 713/1, 170
See application file for complete search history.

(56) References Cited

U.S. PATENT DOCUMENTS

| 7,380,049 | B2 * | 5/2008 | Rajagopal et al. | 711/6 |
|---|---|---|---|---|
| 7,725,305 | B2 * | 5/2010 | Taillefer et al. | 703/23 |
| 2007/0011486 | A1 * | 1/2007 | Li et al. | 714/5 |
| 2007/0106986 | A1 * | 5/2007 | Worley | 718/1 |
| 2007/0204153 | A1 * | 8/2007 | Tome et al. | 713/164 |
| 2007/0204166 | A1 * | 8/2007 | Tome et al. | 713/182 |
| 2007/0266383 | A1 * | 11/2007 | White | 718/1 |
| 2007/0283348 | A1 * | 12/2007 | White | 718/1 |
| 2008/0082976 | A1 * | 4/2008 | Steinwagner et al. | 718/1 |
| 2008/0104586 | A1 * | 5/2008 | Thorton et al. | 718/1 |
| 2008/0276258 | A1 * | 11/2008 | Liu et al. | 719/327 |

* cited by examiner

*Primary Examiner* — Stephen C Elmore (57) ABSTRACT

In one embodiment, a computer system comprises a host machine comprising a plurality of compute resources, at least one secure memory location coupled to the host machine, wherein the secure memory location stores host machine configuration data, and a virtual machine host module coupled to the host machine. The virtual machine host module comprises logic to map a path to the secure memory location, receive a signal indicating whether a first virtual machine guest should be permitted access to the host machine configuration data, and associate at least a portion of the host machine configuration data with the first virtual machine guest when the when the signal indicates that the first virtual machine guest should be permitted to access the configuration data.

18 Claims, 7 Drawing Sheets

SELECTIVE EXPOSURE OF CONFIGURATION IDENTIFICATION DATA IN VIRTUAL MACHINES

BACKGROUND

This application relates to electronic computing and more particularly to exposing configuration identification information in virtual computing systems.

High-end computer systems which support partitioning of the server to smaller systems running multiple instances of Operating Systems (OS) are gaining acceptance. Existing systems support two types of partitioning mechanisms: hard partitions and virtual partitions.

Hard partitions are electrically isolated and have their own central processing unit (CPU), memory and input/output (I/O) resources. Hardware faults in these partitions are self contained and do not affect the other partitions within the same server complex. Resources available within a hard partition can be expanded dynamically by adding more resources, e.g., CPUs, memory and I/O slots. Hard partitions may be expanded by adding a group of CPUs, memory and IO to the existing partition.

Virtual partitions are software-created partitions. Virtual partitions share computing resources within an existing system (or hard partition) and are implemented via a low level partition manager (or monitor), which controls both the allocation and visibility of Computing Resources to different instances of Operating Systems executing on the different virtual partitions. These partitions provide software fault isolation across OS instances. Likewise, it is possible to allocate and/or constrain Computing Resources between the virtual partitions of an existing system (or hard partition).

In some partitioned computer systems a host system executes a software module, referred to herein as a hypervisor, that fulfills the role of a low level partition manager or monitor in the management of computing resources. This hypervisor allows users to instantiate virtual machines, which present themselves to the virtual machine host as physical servers. The hypervisor manages the physical computing resources of the underlying computer system in such a way that the underlying resources can be completely isolated, or abstracted, from the virtual machines. This abstraction has the desirable feature of increasing the degree of flexibility in allocating compute resources, but limits visibility of virtual machines into the underlying computer system.

DETAILED DESCRIPTION

Described herein are exemplary systems and methods for exposing host machine configuration identification information to virtual machines operating in virtual computing systems. The methods described herein may be embodied as logic instructions on a computer-readable medium. When executed on one or more processor(s), the logic instructions cause the processor(s) to be programmed as a special-purpose machine that implements the described methods. The processor(s), when configured by the logic instructions to execute the methods recited herein, constitutes structure for performing the described methods.

Figure 1:
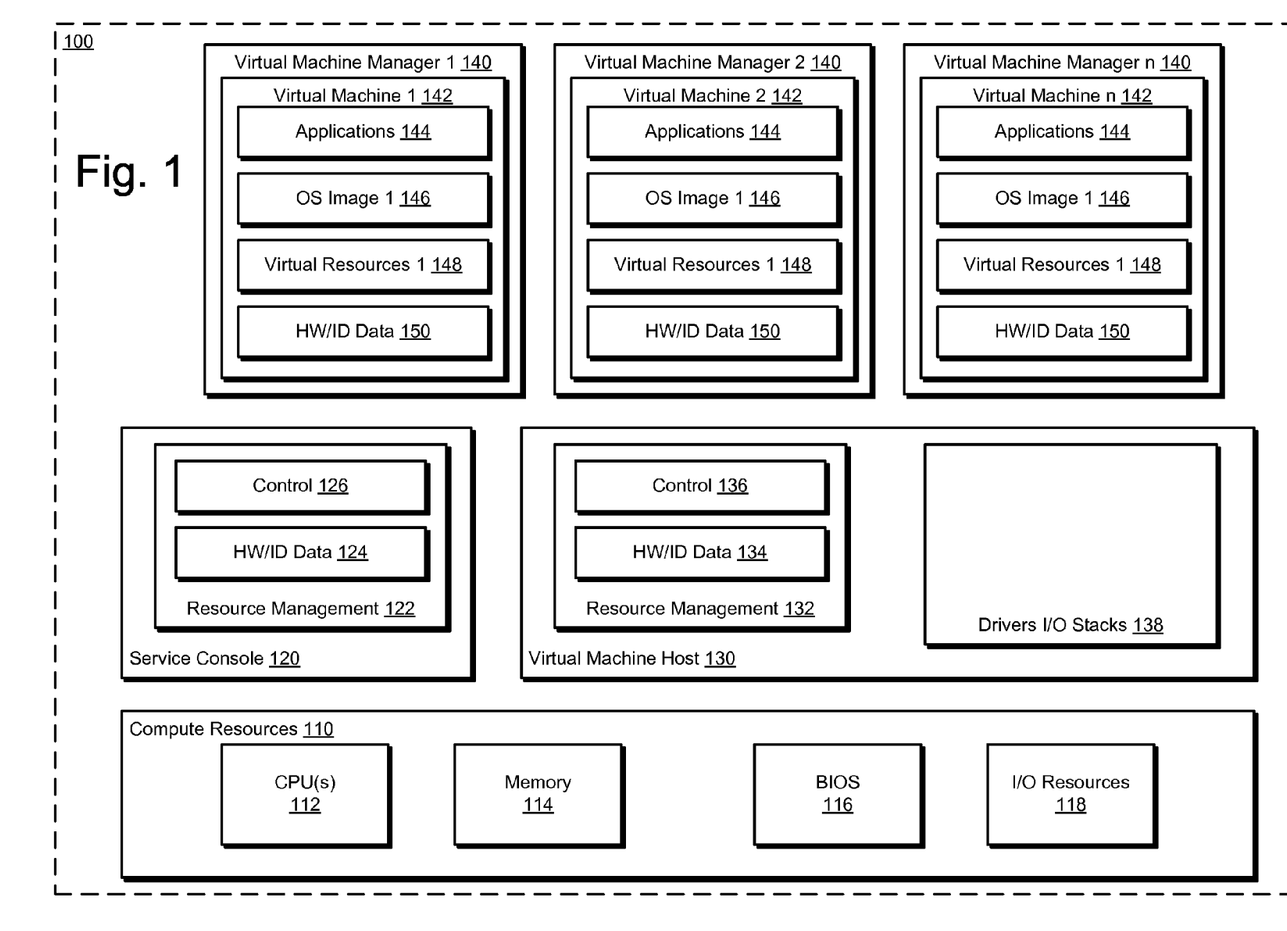
FIG. 1 is a schematic illustration of a virtualized computer system, according to embodiments.

As used herein, the terms "host machine configuration information" refers to configuration information associated with physical resources in the computer system 100 which are allocated to a virtual machine. Such information may include, but need not be limited to, System Management Basic Input/Output System (SMBIOS) information, System information, Baseboard information, System Enclosure or Chassis information, Processor information, host Network Interface Card (NIC) information, and host storage device/controller information.

FIG. 1 is a schematic illustration of a virtualized computer system, according to embodiments. Referring to FIG. 1, system 100 comprises host machine compute resources 110, which includes at least one CPU 112, system memory 114, an SMBIOS 116, and input/output resources 118. Various embodiments of compute resources are described with reference to FIGS. 4 and 5, below.

A virtual machine host module 130 executes on host machine compute resources 110. In some embodiments, virtual machine host is embodied as a software module having logic including drivers and input/output stacks 138 which enables the system 100 to instantiate at least one virtual machine 142 and which manages the underlying host machine compute resources 110 to enable the virtual machines to utilize the resources in a virtual fashion. In practice, the virtual machine host 130 may instantiate any number of virtual machines 142 to execute on the system 100. In the embodiment depicted in FIG. 1, three virtual machines are depicted, i.e., virtual machine 1, virtual machine 2, and virtual machine n.

Each virtual machine 140 comprises virtual resources 148, an operating system image 146, and may execute one or more applications 144. Virtual machines executing on the system 100 may instantiate different operating systems. For example, virtual machine one 142 may instantiate a UNIX® operating system while virtual machine to 140 may instantiate a Windows based operating system. As described above, the physical host machine compute resources 110 are managed by the virtual machine host 130 to provide each virtual machine 142 with virtual resources 148. Thus, the virtual resources 148 may be modified dynamically to compensate for changes in the operating environment of each virtual machine 142.

In some embodiments, the system 100 is adapted to expose host machine configuration data to virtual machines operating on the system 100. In one embodiment, virtual machine host 130 further includes a resource management module 132 which includes a control module 136. Control module 136 may be embodied as logic which, when executed on a processor such a CPU 112, extracts host machine configuration data pertaining to the host machine compute resources 110 from the host machine and store the host machine configuration data as hardware/identification data 134, for example in a secure storage area.

Figure 2:
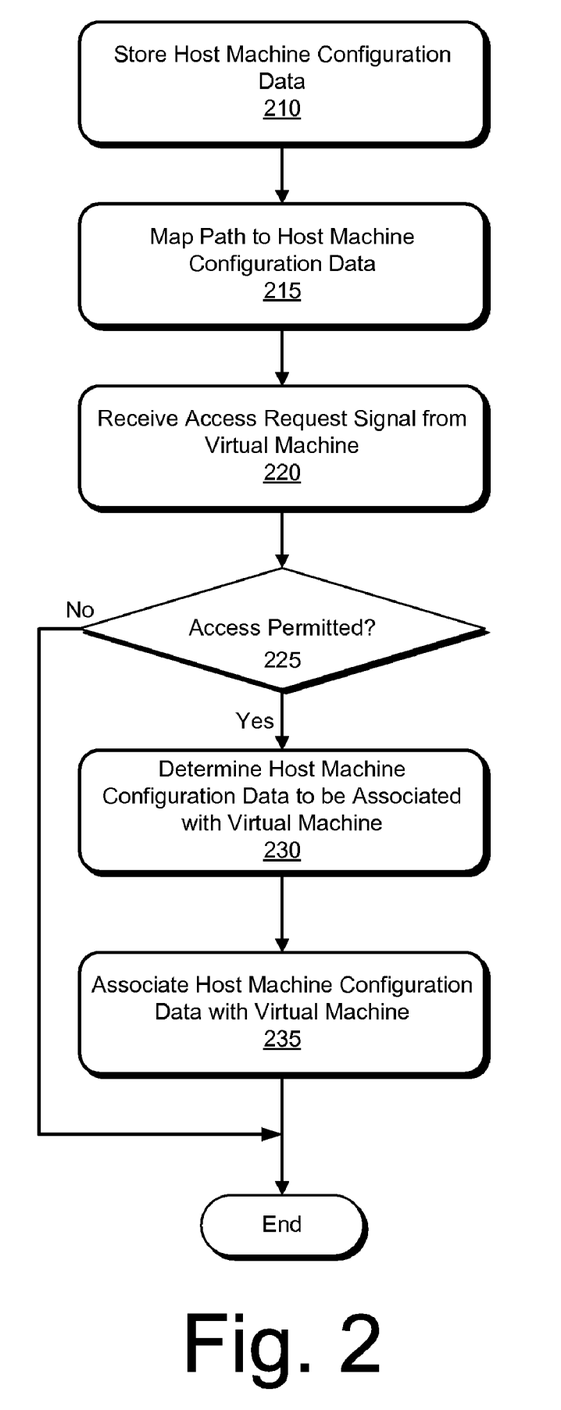
FIG. 2 is a flowchart illustrating operations associated with exposing configuration identification information in virtual computing systems, according to some embodiments.
Figure 3:
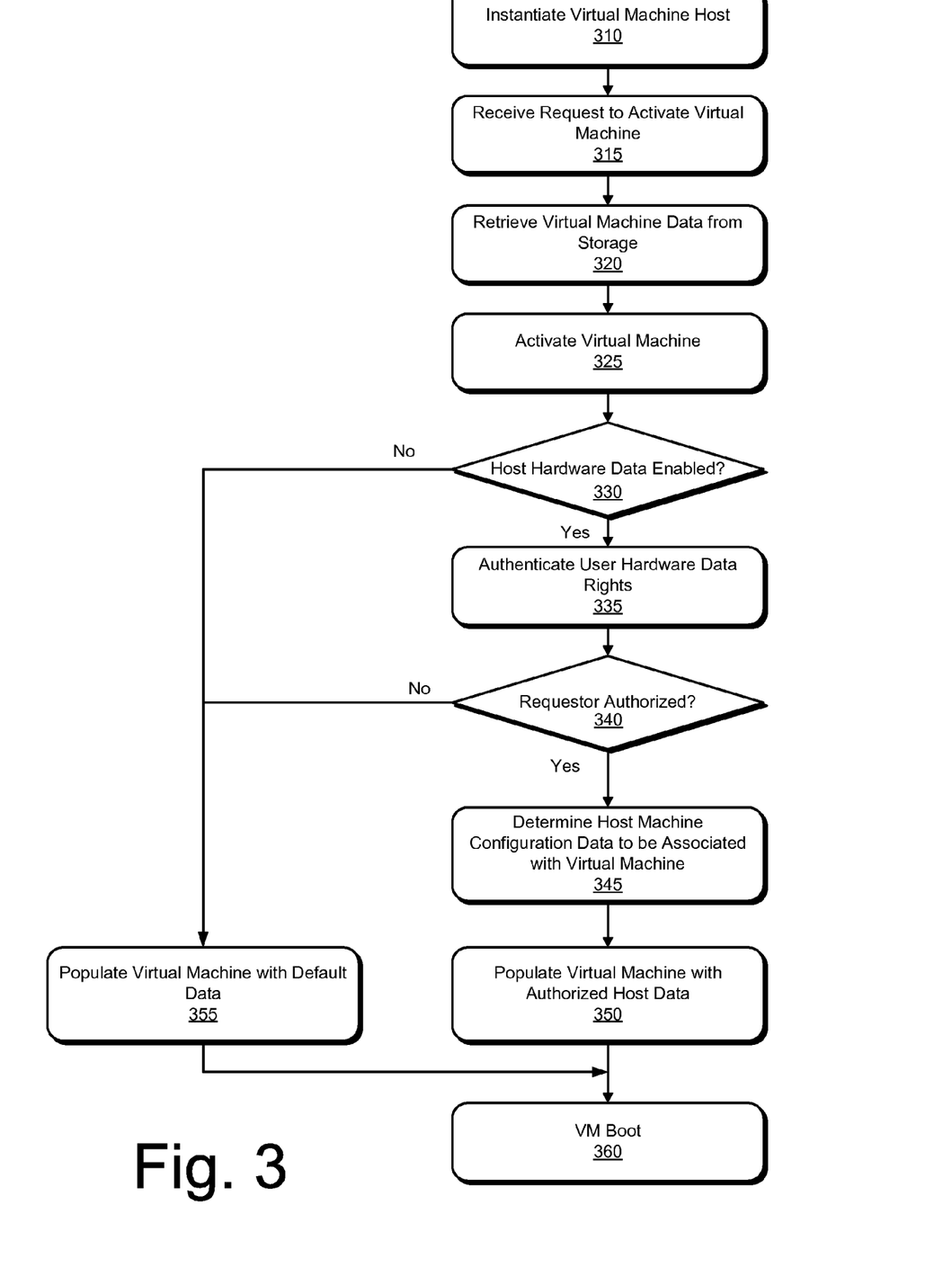
FIG. 3 is a flowchart illustrating operations associated with exposing configuration identification information in virtual computing systems, according to some embodiments.

In alternate embodiments the logic to expose host machine configuration data to virtual machines operating on the system 100 may be implemented in a service console 120 which is separate from the virtual machine host 130. Thus, in the embodiment depicted in FIG. 1, the system 100 comprises a service console 120 having a resource management module 122, which in turn comprises a control module 126 and a hardware/identification module 124. Service console 120 may operate alone or in conjunction with virtual machine host 130. FIGS. 2-3 illustrate operations implemented by elements of the system 100 to expose host machine configuration data to virtual machines operating on the system 100.

FIG. 2 is a flowchart illustrating operations associated with exposing configuration identification information in virtual computing systems, according to some embodiments. In some embodiments, the operations depicted in FIG. 2 may be implement by the control module 136 of the virtual machine host (or the control module 126 of the service console 120), alone or in conjunction with other modules of the system 100.

Referring to FIG. 2, that operation 210 host machine configuration data is stored in a secure memory location coupled to the computer system 100. In some embodiments, the control module 136 may extract host machine configuration data from host machine compute resources 110 assigned to a specific virtual machine 142 and may store the host machine configuration data in a secure memory location. In some embodiments, the control module 136 creates a protected area in the file system or other memory location of computer system 100. For example, in some embodiments the host machine configuration data may be stored in a secure memory location in memory 114.

At operation 215 a path to the host machine configuration data is mapped. In some embodiments, the control module 136 maps a path to the secure memory location in which the host machine configuration data resides. At operation 220 an access request signal is received from a virtual machine 142 operating on system 100. For example, a virtual machine 142 operating on system 100 may generate a request to access host machine configuration data as part of a process to instantiate the virtual machine 142, or as part of a process in which resources dedicated to the virtual machine 142 are reallocated among virtual machines by the virtual machine host 130.

At operation 225 it is determined whether the virtual machine that originated the request to access the host machine configuration data is permitted to access the data. For example, in some embodiments and administrator of the system 100 may establish policies defining which virtual machines 142 may have access to the host machine configuration data associated with the underlying compute resources and computer system 100. The policies may be implemented by the administrator through a suitable user interface, or may be implemented programmatically by the virtual machine host 130.

If, at operation 225, the virtual machine is not permitted to have access to the host machine configuration data in the process terminates. By contrast, is that operation 225 the virtual machine is permitted to have access to the underlying host machine configuration data, then control passes to operation 230 and the system providing the authorization for configuration data exposure is queried to determine which data should be exposed to the virtual machine 142. This authorized set of data to be exposed may be a subset of the total host machine configuration data available for exposure to the virtual machine 142, or it may be the complete set of host machine configuration data available for exposure to the virtual machine 142. Once the authorized host machine configuration data has been identified, control passes to operation 235 and the host machine configuration data is associated with the virtual machine 142. For example, in some embodiments the host machine configuration data may be written to a memory location associated with the virtual machine guest such as the hardware/identification data module 150 depicted in virtual machine 142.

In some embodiments, the control module under 136 of the virtual machine host intercepts calls originating from a virtual machine for configuration information associated with the first virtual machine, accesses the host machine configuration data, and writes the host machine configuration in response to the call originating from the virtual machine.

In some embodiments, and host machine configuration data may be retrieved as part of the process of instantiating a virtual machine and computer system 100. FIG. 3 is a flowchart illustrating operations associated with exposing configuration identification information in virtual computing systems, according to some embodiments. Referring to FIG. 3, at operation 310 the virtual machine host 130 is instantiated on the system 100. Operation 310 may include presenting, on a user interface (such as display 402 described below), an option to instantiate a virtual machine guest on the host computer system and presenting on the user interface (such as display 402), an option to request access to configuration data associated with the host computer system. At operation 315 a request is received to activate a virtual machine, such as one of virtual machines 142, on the system 100. For example, the request may be originated by a user of the system.

At operation 320 virtual machine data is retrieved from storage. For example, in the event that the user had previously established a virtual machine on the system 100 context information associated with virtual machine may be stored in system memory 114. Such context information or other information useful to activate the virtual machine is retrieved from the memory module 114 by the virtual machine host 130, and that operation 325 the virtual machine host 130 activates the virtual machine.

If, at operation 330, the virtual machine is not permitted to access host hardware configuration data, then control passes to operation 355 and the hardware/identification data module 150 associated with the virtual machine 142 is populated with the default data which does not specifically identify host machine compute resources 110. By contrast, if at operation 330 the virtual machine is permitted to access host hardware configuration data, then control passes to operation 335 and the virtual machine host 130 authenticates the user hardware data rights. That is, authenticating a user in response to a signal received, whereby the signal is requesting access to configuration data associated with the host computer system, is performed in operation 335. For example, as mentioned above an administrator of the system may establish policies regarding which virtual machines may be authenticated to access host machine configuration data. These policies may be enforced by the virtual machine host 130 and in some embodiments, specifically by the control module 136 of virtual machine host 130.

If, at operation 340, the requester is not authorized to access host machine configuration data then control again passes to operation 355 and the hardware/identification data module 150 associated with the virtual machine 142 is populated with default data which does not specifically identify host machine compute resources 110. By contrast, if at operation 340 the requester is authorized to access host machine configuration data then control passes to operation 345 and the system providing the authorization for configuration data exposure is queried to determine which data should be exposed to the virtual machine 142. This authorized set of data to be exposed may be a subset of the total host machine configuration data available for exposure to the virtual machine 142, or it may be the complete set of host machine configuration data available for exposure to the virtual machine 142. Once the authorized host machine configuration data has been identified, control passes to operation 350 and the hardware/identification data module 150 associated with the virtual machine 142 is populated with the host machine configuration data. In some embodiments the default data may be supplied in combination with the host machine configuration data.

Once the hardware/identification data module 150 has been populated with suitable configuration data control can pass to operation 360 were the virtual machine is booted into operation such that the virtual machine can be used.

Thus, the operations depicted in FIGS. 2-3 enable a virtual machine such as one of the virtual machines 142 in computer system 100 to access configuration data associated with the underlying components of the host machine. Such access can be managed either directly by an administrator or by policies that can be enforced by the virtual machine host 130 or by the service console 120.

Figure 4:
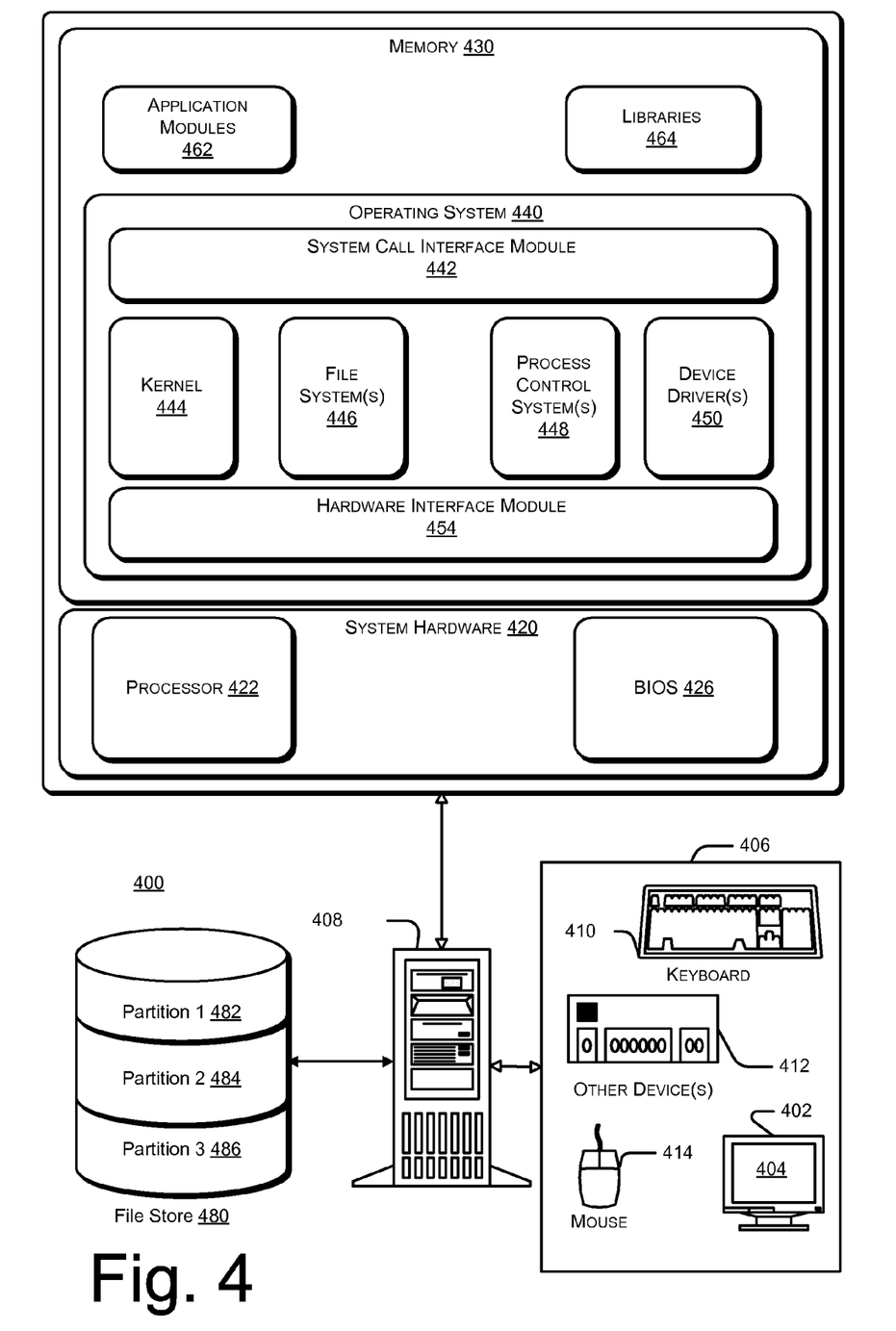
FIG. 4 is a schematic illustration of a computing system, according to an embodiment.

In some embodiments, the computer system 100 may be embodied as a server system. FIG. 4 is a schematic illustration of a computing system, according to an embodiment. The components shown in FIG. 4 are only examples, and are not intended to suggest any limitation as to the scope of the functionality of the display assembly; the display assembly is not necessarily dependent on the features shown in FIG. 4. In the illustrated embodiment, computer system 400 may be embodied as a hand-held or stationary device for accessing the Internet, a desktop PCs, notebook computer, personal digital assistant, or any other processing devices that have a basic input/output system (BIOS) or equivalent.

The computing system 400 includes a computer 408 and one or more accompanying input/output devices 406 including a display 402 having a screen 404, a keyboard 410, other I/O device(s) 412, and a mouse 414. The other device(s) 412 may include, for example, a touch screen, a voice-activated input device, a track ball, and any other device that allows the system 400 to receive input from a developer and/or a user.

The computer 408 includes system hardware 420 commonly implemented on a motherboard and at least one auxiliary circuit boards. System hardware 420 including a processor 422 and a basic input/output system (BIOS) 426. BIOS 426 may be implemented in flash memory and may comprise logic operations to boot the computer device and a power-on self-test (POST) module for performing system initialization and tests. In operation, when activation of computing system 400 begins processor 422 accesses BIOS 426 and shadows the instructions of BIOS 426, such as power-on self-test module, into operating memory. Processor 422 then executes power-on self-test operations to implement POST processing.

Computer system 400 further includes a file store 480 communicatively connected to computer 408. File store 480 may be internal such as, e.g., one or more hard drives, or external such as, e.g., one or more external hard drives, network attached storage, or a separate storage network. In some embodiments, the file store 480 may include one or more partitions 482, 484, 486.

Memory 430 includes an operating system 440 for managing operations of computer 408. In one embodiment, operating system 440 includes a hardware interface module 454 that provides an interface to system hardware 420. In addition, operating system 440 includes a kernel 444, one or more file systems 446 that manage files used in the operation of computer 408 and a process control subsystem 448 that manages processes executing on computer 408. Operating system 440 further includes one or more device drivers 450 and a system call interface module 442 that provides an interface between the operating system 440 and one or more application modules 462 and/or libraries 464. The various device drivers 450 interface with and generally control the hardware installed in the computing system 400.

In operation, one or more application modules 462 and/or libraries 464 executing on computer 408 make calls to the system call interface module 442 to execute one or more commands on the computer's processor. The system call interface module 442 invokes the services of the file systems 446 to manage the files required by the command(s) and the process control subsystem 448 to manage the process required by the command(s). The file system(s) 446 and the process control subsystem 448, in turn, invoke the services of the hardware interface module 454 to interface with the system hardware 420. The operating system kernel 444 can be generally considered as one or more software modules that are responsible for performing many operating system functions.

Figure 5A:
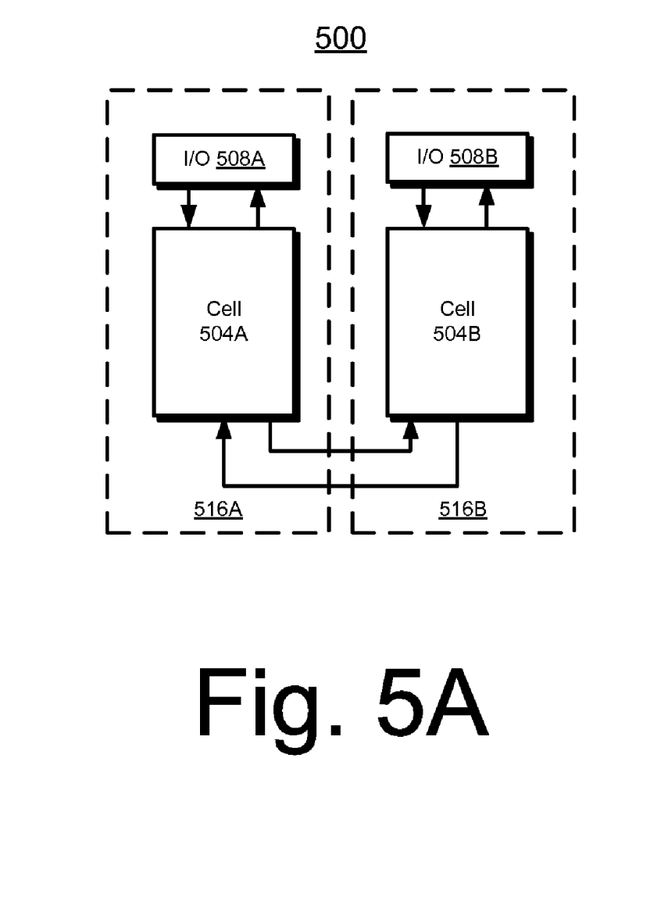
FIGS. 5A, 5B and 5C are schematic illustrations of one embodiment of a multiprocessor computer system according to embodiments.
Figure 5B:
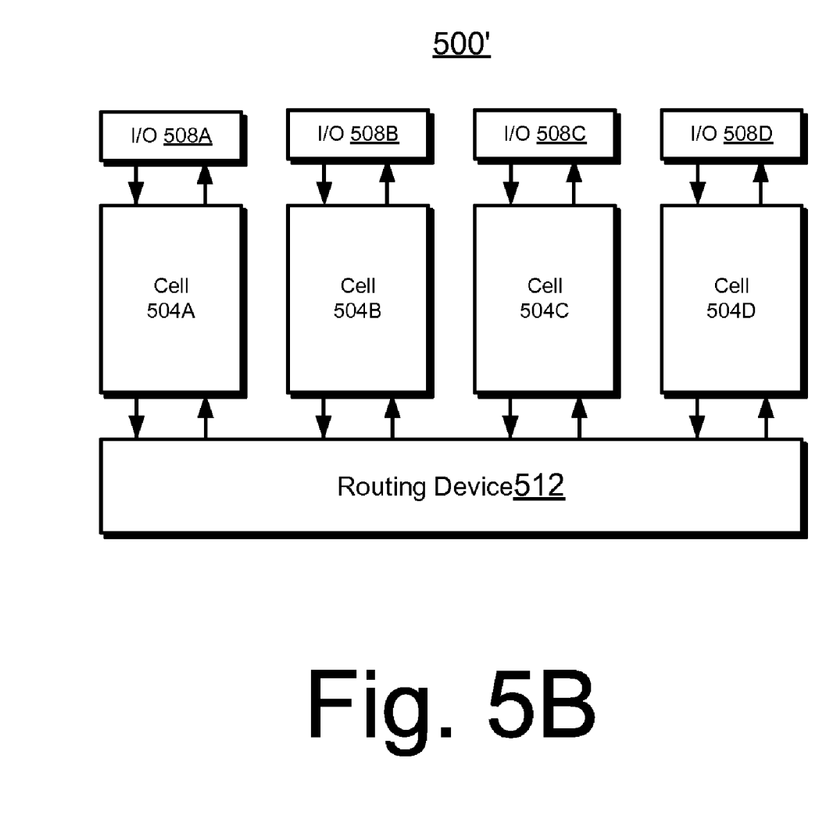
Figure 5C:
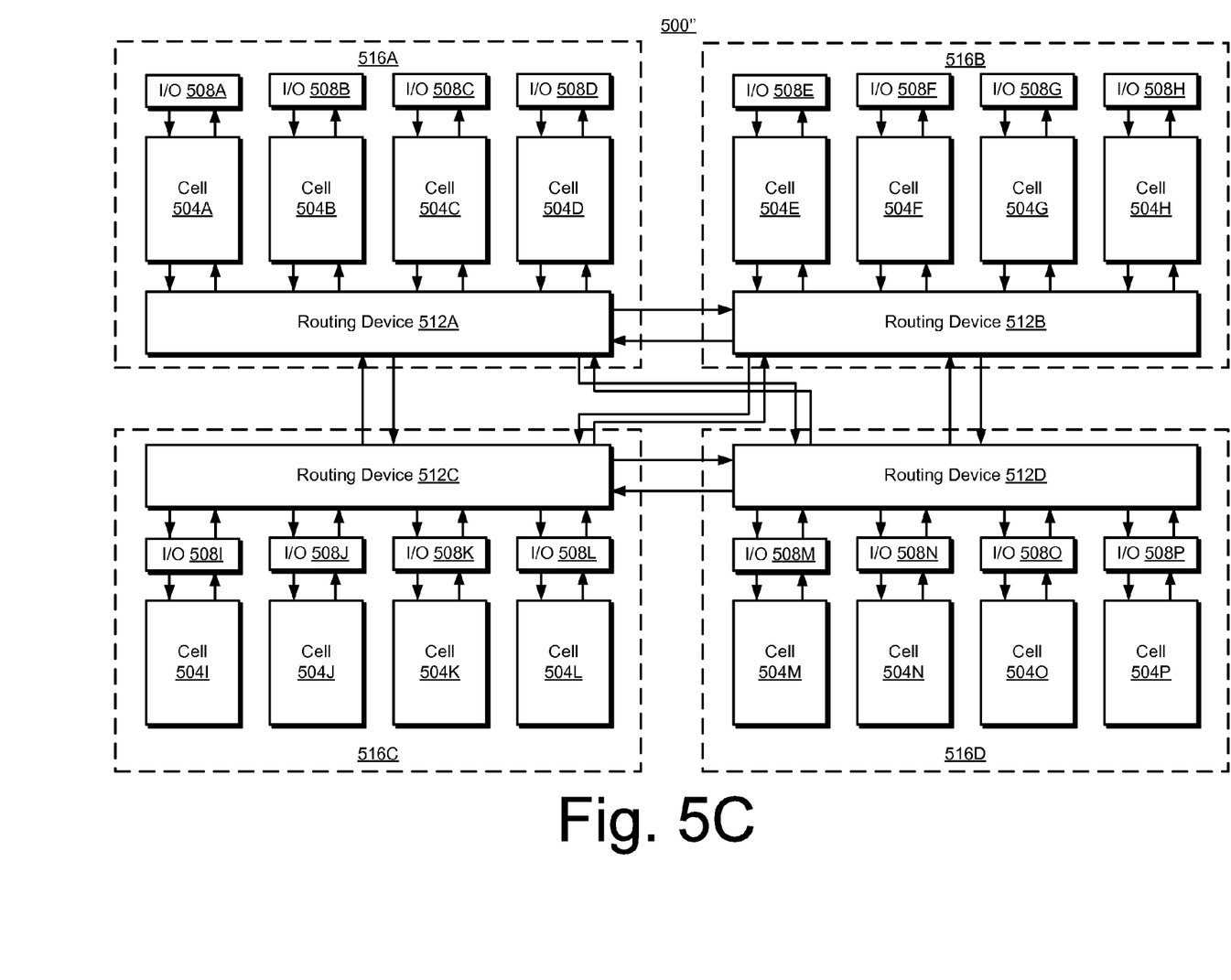

In some embodiments the computer system 100 may be implemented in a partitionable computer system. One embodiment of a partitionable computer system will be described with reference to FIGS. 5A, 5B, and 5C, a partitionable computer system 500 can include a number of elements or cells 504. In FIG. 5A, only two cells 504A and 504B are present. However, more than two cells 504 can create the partitionable computer system 500. For example, FIG. 5B depicts a partitionable computer system 500' having four cells 504A, 504B, 504C, and 504D. In FIG. 5C, sixteen cells 504A, 504B, 504C, 504D, 504E, . . . 504P, create the partitionable computer system 500". Each cell 504 can communicate with a respective input and output module 508, which is used to provide input to the system 500 and output from the system 500.

In partitionable computer systems having more than two cells 504, for example systems 500' and 500" shown in FIGS. 5B and 5C, respectively, the cells 504 can communicate with each other through a routing device 512. The routing device can be a crossbar switch or other similar device that can route data packets. For example, a NUMAflex® 8-Port Router Interconnect Module sold by SGI of Mountain View, Calif. can be used. The routing device 512 facilitates the transfer of packets from a source address to a destination address. For example, if cell 504A sends a packet to cell 504D, cell 504A sends the packet to the routing device 512, the routing device 512 in turn, transmits the packet to cell 504D.

In a larger partitionable computer system, such as the system 500" shown in FIG. 5C, there can be more than one routing device 512. For example, there can be four routing devices 512A, 512B, 512C, and 512D. The routing devices 512 collectively can be referred to as the switch fabric. The routing devices 512 can communicate with each other and a number of cells 504. For example, cell 504A, cell 504B, cell 504C and cell 504D can communicate directly with routing device 512A. Cell 504E, cell 504F, cell 504G, and cell 504H can communicate directly with routing device 512B. Cell 504I, cell 504J, cell 504K, and cell 504L can communicate directly with routing device 512C. Cell 504M, cell 504N, cell 504O, and cell 504P can communicate directly with routing device 512D. In such a configuration, each routing device 512 and the cells 504 that the routing device 512 directly communicates with can be considered a partition 516. As shown, in FIG. 5C there are four partitions 516A, 516B, 516C and 516D. As shown, each partition includes four cells, however; any number of cells and combination of cells can be used to create a partition. For example, partitions 516A and 516B can be combined to form one partition having eight cells. In one embodiment, each cell 504 is a partition 516. As shown in FIG. 5A, cell 504 can be a partition 516A and cell 504B can be a partition 516B. Although the embodiment depicted in FIG. 5C has four cells, other embodiment may have more or fewer cells.

Each partition can be dedicated to perform a specific computing function. For example, partition 516A can be dedicated to providing web pages by functioning as a web server farm and partition 516B can be configured to provide diagnostic capabilities. In addition, a partition can be dedicated to maintaining a database. In one embodiment, a commercial data center can have three tiers of partitions, the access tier (e.g., a web farm), application tier (i.e., a tier that takes web requests and turns them into database queries and then responds to the web request) and a database tier that tracks various action and items.

Figure 5D:
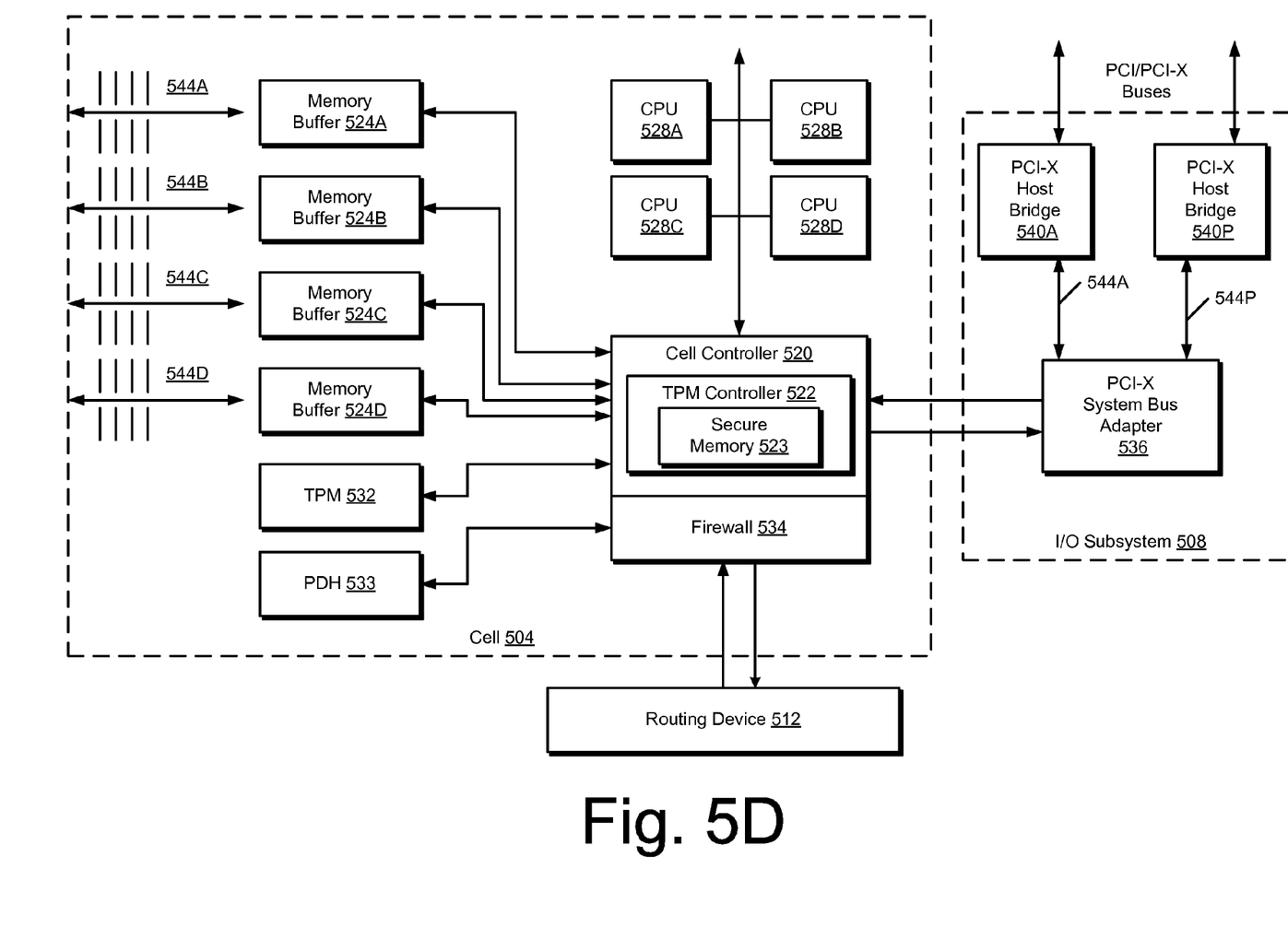
FIG. 5D is a block diagram of a cell, such as the cell depicted in FIG. 5B, according to some embodiments.

With reference to FIG. 5D, each cell 504 includes a cell controller 520, a plurality of memory buffers 524A, 524B, 524C, 524D (referred to generally as memory buffers 524), one or more central processing units (CPUs) 528A, 528B (referred to generally as CPUs 528 or processors 528), a TPM (Trusted Platform Module) 532, a Platform Dependent Hardware (PDH) blocks 533, and a firewall 534. The term CPU is not intended to be limited to a microprocessor, instead it is intended to be used to refer to any device that is capable of processing. The memory buffers 524, CPUs 528, and TPM 532 each communicate with the cell controller 520. When the cell 504 is in communication with a crossbar 512, the cell controller 520 is also in communication with the crossbar 512. The cell controller 520 is also in communication with the I/O subsystem 508.

In some embodiments, cell controller 520 comprises a trusted platform module controller 522, which in turn comprises a memory module 523. The TPM controller 522 and a secure memory 523 may be integrated within the cell controller 520, or may be an adjunct controller coupled to the cell controller 520. The cell controller 520 and TPM controller 522, as well as a discrete TPM 532 can be any kind of processor including, for example, a conventional processor, or a field programmable gate array (FPGA). The cell controller 520 may include a communications bus (not shown) that is used to route signals between the TPM 532, the CPUs 528, the memory buffers 524, the routing device 512 and the I/O subsystem 508. The cell controller 520 also performs logic operations such as mapping main memory requests into memory DIMM requests to access and return data and perform cache coherency functions for main memory requests so that the CPU and I/O caches are always consistent and never stale.

In one embodiment, the I/O subsystem 508 include a bus adapter 536 and a plurality of host bridges 540. The bus adapter 536 communicates with the host bridges 540 through a plurality of communication links 544. Each link 544 connects one host bridge 540 to the bus adapter 536. As an example, the bus adapter 536 can be a peripheral component interconnect (PCI) bus adapter. The I/O subsystem can include sixteen host bridges 540A, 540B, 540C, . . . , 540P and sixteen communication links 544A, 544B, 544C, . . . , 544P.

As shown, the cell 504 includes fours CPUs 528, however; each cell includes various numbers of processing units 528. In one embodiment, the CPUs are ITANIUM® based CPUs, which are manufactured by Intel of Santa Clara, Calif. Alternatively, SUN UltraSparc® processors, IBM power™ processors, Intel Pentium® processors, or other processors could be used. The memory buffers 524 communicate with eight synchronous dynamic random access memory (SDRAM) dual in line memory modules (DIMMs) 544, although other types of memory can be used.

Although shown as a specific configuration, a cell 504 is not limited to such a configuration. For example, the I/O subsystem 508 can be in communication with routing device 512. Similarly, the DIMM modules 544 can be in communication with the routing device 512. The configuration of the components of FIG. 5D is not intended to be limited in any way by the description provided.

In some embodiments, a multiprocessor computer system such as the computer system depicted in FIGS. 5A-5D may utilize a trusted platform module controller 522 and a secure memory module 523 as a surrogate TPM, or in combination with an actual TPM 532. Including a secure memory and a custom TPM controller in the implementation of the TPM programming model presented to the CPU enables trusted platform module data to be portable between cells in a multiprocessor computer system. For example, in some circumstances hardware and/or software resources may need to be shifted between cells, or partitions, in a multiprocessor computer system. Accordingly, trusted platform module data associated with the cell may need to be migrated from a first cell's secure memory module to a second cell's secure memory module in the computer system.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to make host machine configuration data available to virtual machine guests in a virtualized computer system, comprising:
   storing the host machine configuration data in a secure memory location coupled to a host machine;
   mapping in a virtual machine host, via a processor in the host machine, a path to the secure memory location;
   receiving in the virtual machine host, via the processor in the host machine, a signal indicating whether a first virtual machine should be permitted access to the configuration data; and
   associating, via the processor of the host machine, at least a portion of the host machine configuration data with a first virtual machine guest when the signal indicates that the first virtual machine should be permitted to access the configuration data.

2. The method of claim 1, wherein the host machine configuration data comprises system management data extracted from the basic input/output system (BIOS) of the host machine.

3. The method of claim 1, wherein the host machine configuration data comprises data extracted from a subsystem of the virtual machine host.

4. The method of claim 1, wherein storing the host machine configuration data in a secure memory location coupled to the host machine comprises creating a protected area in a file system executing on the host machine.

5. The method of claim 1, wherein receiving, in the virtual machine host, a signal indicating whether a first virtual machine should be permitted access to the configuration data comprises receiving a request to instantiate the first virtual machine guest.

6. The method of claim 1, wherein associating at least a portion of the host machine configuration data with the first virtual machine comprises writing the host machine configuration data to a memory location associated with the virtual machine when the signal indicates that the first virtual machine guest should be permitted to access the configuration data.

7. The method of claim 1, wherein associating at least a portion of the host machine configuration data with the first virtual machine guest comprises:
   intercepting, in the virtual machine host, a call originating from the first virtual machine for configuration information associated with the first virtual machine;
   accessing the host machine configuration data; and
   writing the host machine configuration in response to the call originating from the first virtual machine.

8. A computer system, comprising:
   a host machine comprising a plurality of computer resources;
   at least one secure memory location coupled to the host machine, wherein the secure memory location stores host machine configuration data; and
   a virtual machine host module coupled to the host machine, wherein the virtual machine host module comprises logic to:
   map a path to the secure memory location;
   receive a signal indicating whether a first virtual machine guest should be permitted access to the host machine configuration data; and
   associate at least a portion of the host machine configuration data with the first virtual machine guest when the signal indicates that the first virtual machine guest should be permitted to access the configuration data.

9. The computer system of claim 8, wherein the host machine configuration data comprises system management data extracted from the basic input/output system (BIOS) of the host machine.

10. The computer system of claim 8, wherein the host machine configuration data comprises data extracted from a subsystem of the virtual machine.

11. The computer system of claim 8, wherein the host machine configuration data is stored in a protected area in a file system executing on the host machine.

12. The computer system of claim 8, wherein the virtual machine host receives a request to instantiate the first virtual machine guest.

13. The computer system of claim 8, wherein the virtual machine host writes the host machine configuration data to a memory location associated with the virtual machine guest when the signal indicates that the first virtual machine guest should be permitted to access the configuration data.

14. The computer system of claim 8, wherein the virtual machine host comprises logic to:
   intercept, in the first virtual machine guest, a call originating from the first virtual machine guest for configuration information associated with the first virtual machine guest; and
   access the host machine configuration data; and
   write the host machine configuration in response to the call originating from the first virtual machine guest.

15. A method to instantiate a virtual machine guest in a host computer system, comprising:
   instantiating a virtual machine host on the computer system;
   receiving in the virtual machine host, via a processor in the host computer system, a request to activate a virtual machine guest on the computer system;
   storing host machine configuration data associated with the virtual machine guest in a secure memory location of the host computer;
   mapping via a processor in the host machine, a path to the secure memory location;

retrieving, via the processor in the host computer system, the configuration data associated with the virtual machine guest;

activating, via the processor in the host computer system, the virtual machine guest; and populating, via the processor in the host computer system, the virtual machine guest with configuration data from the host computer system.

16. The method of claim 15, wherein receiving, in the virtual machine host, a request to activate a virtual machine guest on the computer system comprises:

presenting, on a user interface, an option to instantiate a virtual machine guest on the host computer system; and presenting, on the user interface, an option to request access to configuration data associated with the host computer system.

17. The method of claim 16, further comprising:

receiving a signal requesting access to configuration data associated with the host computer system; and authenticating the user in response to the signal.

18. The method of claim 15, wherein retrieving configuration data associated with the virtual machine guest comprises accessing a memory location managed by the basic input/output system of the host computer system.

* * * * *

UNITED STATES PATENT AND TRADEMARK OFFICE
CERTIFICATE OF CORRECTION

| | | |
|---|---|---|
| PATENT NO. | : 7,941,623 B2 | Page 1 of 1 |
| APPLICATION NO. | : 11/948633 | |
| DATED | : May 10, 2011 | |
| INVENTOR(S) | : Bruce Aaron Tankleff | |

It is certified that error appears in the above-identified patent and that said Letters Patent is hereby corrected as shown below:

In column 10, line 35, in Claim 10, delete "machine." and insert -- machine host. --, therefor.

Signed and Sealed this
Fourteenth Day of August, 2012

David J. Kappos
*Director of the United States Patent and Trademark Office*